Mar. 13, 1923.

J. H. BRYANT

LAWN SWEEPER

Filed Sept. 8, 1921

1,448,385

INVENTOR
John H. Bryant
BY
Wooster T Davis
ATTORNEYS

Patented Mar. 13, 1923.

1,448,385

UNITED STATES PATENT OFFICE.

JOHN H. BRYANT, OF DANBURY, CONNECTICUT.

LAWN SWEEPER.

Application filed September 8, 1921. Serial No. 499,136.

*To all whom it may concern:*

Be it known that I, JOHN H. BRYANT, a citizen of the United States, residing at Danbury, county of Fairfield, State of Connecticut, have invented an Improvement in Lawn Sweepers, of which the following is a specification.

This invention relates to lawn sweepers and has for an object to provide a sweeper of this type which is simple in construction and cheap to manufacture and yet efficient in operation.

It is also an object of this invention to so arrange the receptacles for the sweepings and the brush that they tend to counterbalance each other, thus removing considerable weight from the roller adjacent the brush and also the weight necessary to be lifted by the operator in shifting the brush.

It is a further object of the invention to provide a sweeper which will not throw the leaves and cut grass forwardly over a walk, or the like, in approaching the same.

It is a further object of the invention to provide a structure which will allow an easy and expeditious removal of the sweepings.

In carrying out my invention I provide two supporting and driving wheels mounted adjacent the forward end of an open ended receptacle, a rotating brush adjacent the rear end of the receptacle, means for rotating the brush from the driving wheels, a removable auxiliary receptacle, mounted at the forward end of the first named receptacle, handles extending to the rear for operating the sweeper, a bottom for the main receptacle hinged adjacent the forward end thereof and means accessible adjacent the driving handles for lifting the rear end of said bottom to transfer the material from the main receptacle to the auxiliary receptacle.

Referring to the accompanying drawings which illustrate one embodiment of my invention, Fig. 1 is a side elevation of my improved sweeper assembled.

Figure 1:
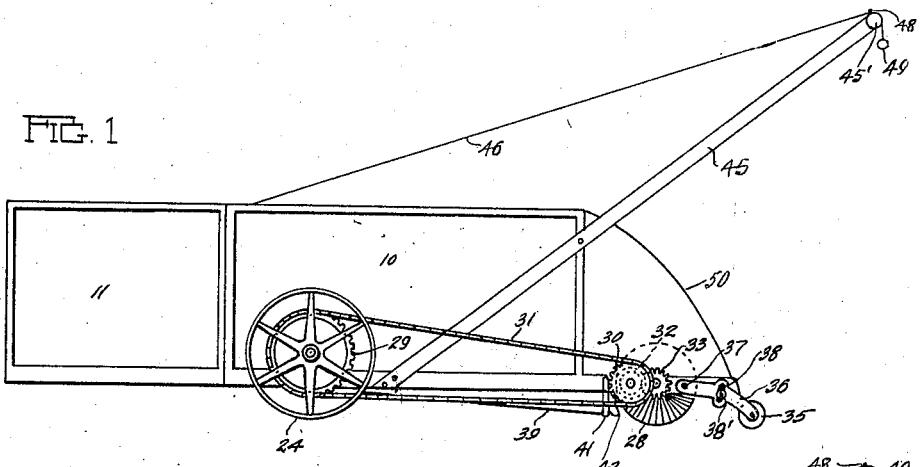
Figure 2:
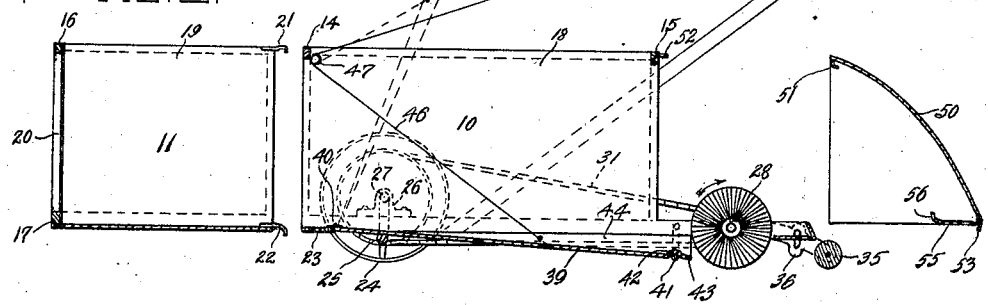
Fig. 2 is a longitudinal sectional elevation showing the auxiliary receptacle and cover for the sweeping mechanism removed.
Figure 3:
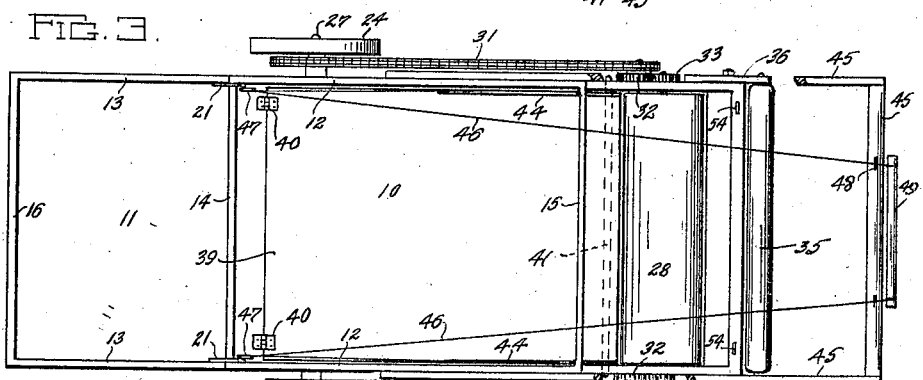
Fig. 3 is a top plan view.
Figure 4:
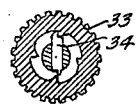
Fig. 4 is a detail of the driving mechanism for the brush.

The sweeper comprises a main receptacle 10 and an auxiliary receptacle 11. These receptacles may be constructed of any suitable material but are preferably constructed of side frames 12 and 13 made of wood, the frames 12 being connected by the cross bars 14 and 15, and the frames 13 by the cross bars 16 and 17. The side frames 12 and 13 are covered by tacking canvas 18 and 19 on the inner walls thereof and the front end of the receptacle 11 is closed by means of canvas 20. The main receptacle 10, however, is left open at its opposite ends, as shown, and the auxiliary receptacle 11 is open at its rear end. Suitable projections 21 and 22, preferably in the form of hooks, are used to removably support the auxiliary receptacle 11 at the forward end of the main receptacle 10, the hook 21 engaging the cross bar 14 or suitable eyes thereon, while the hooks 22 are inserted in suitable openings 23 in the bottom of the main receptacle 10.

Suitable driving and supporting wheels 24 are mounted on opposite sides of the main receptacle 10 adjacent the forward end thereof by means of any suitable bearings mounted on the frame of the receptacle 10. I have disclosed a rod 25 extending under the bottom of the main receptacle bent upwardly at its opposite ends and extending through suitable bearing brackets 26 and having free ends 27 forming bearings for the wheels. The wheels may be secured thereon by any suitable means such as cotter pins.

The rotating brush 28 is mounted to rotate in a frame formed either by rearward extensions of the lower members of the side frames 12 or by a separate frame attached thereto, as desired. This brush is mounted to rotate in the direction indicated by the arrow adjacent the rear open end of the main receptacle 10. It is driven from the driving wheels 24 by any suitable means but preferably as shown by sprockets 29, one for each driving wheel, driving a second sprocket 30 by means of a suitable chain 31, the sprockets 30 each having a spur gear 32 meshing with a spur gear 33 on the shaft for the brush, a suitable one-way pawl 34 being provided in the gears 33 acting to operate the brush only when the sweeper is pushed forwardly, as is well known. To the rear of the brush is rotatably mounted a roller 35, the bearings therefor being in suitable adjustable brackets 36. These brackets may be mounted in any suitable manner but preferably are pivoted on the frame for the brush at 37 and have elongated slots 38 through which screws 38' extend to allow vertical adjustment of the roller. It will be obvious that, by adjusting the roller 38 up and down, the height of the brush 28 may be adjusted either to compensate for wear or to vary its operation under varying conditions.

The bottom 39 of the main receptacle 10 is preferably composed of a piece of sheet metal hinged adjacent the forward open end by any suitable means 40. It is supported at its rear end by any suitable means, preferably a substantially U-shaped rod 41 having its ends inserted in the side frames of the receptacle 10 and resting in a groove 42 formed in the bottom member 39 adjacent the rear edge thereof, this edge being bent downwardly at 43 and stopping a short distance in front of the point of contact of the brush and the ground. The bottom 39 is bent upwardly to form opposite sides 44 to close the space between the bottom member 39 and the side frames and also to form guiding side walls when the bottom is lifted to transfer the sweepings to the auxiliary receptacle 11.

A suitable handle, comprising side bars 45 extending rearwardly of the sweeper and fastened to the side frames 12 and a hand bar 45', is provided for operating the sweeper. Suitable means are provided adjacent the hand bar 45' for lifting the bottom 39 when it is desired to either dump the sweepings through the open end of the main receptacle 10 to any suitable dump or to transfer them into the auxiliary receptacle 11, and comprises preferably a cord or wire 46 connected to each of the sides 45 passing over suitable guides or pulleys 47 to guides 48 on the handle 45' and are secured to a suitable draw bar 49.

The brush in operation is enclosed by a suitable cover 50, preferably made of sheet metal, and is mounted over the brush by means of curved hooks 51 inserted in suitable eyes 52 at the rear end of the main receptacle 10 and at its lower end is provided with projections 53 extending into suitable recesses 54 in the frame for the brush, the hooks 52 also acting as hinges should it be desired to look at the brush without removing the cover. This cover also carries, at its lower side to the rear of the brush, a small shelf 55 upturned at its forward end 56 to catch any leaves or sweepings which may stick to the brush and be carried over to the rear thereof.

In operation, when the sweeper is assembled, the leaves or grass or whatever is desired to sweep, are pushed forwardly by the rotating brush into the main receptacle 10 over the rear edge 43 of the hinged bottom. When a certain accumulation has been deposited upon this bottom, it is raised about its hinges 40 by pulling on the bar 49 transferring the sweepings to the auxiliary receptacle 11 which may be removed at any time and the sweepings therein deposited in a wheelbarrow or any other suitable receiving means. It will be apparent that, by mounting the auxiliary receptacle forwardly of the supporting wheels 24, it tends to counterbalance the weight of the brush and its operating mechanism, thus removing part of its weight from the roller 35 and making the sweeper easier to operate and also makes it easier for the operator to lift the brush by means of the handle 45 when it is desired to swing it sidewise, to lift it over an obstruction or run it when not sweeping. Also, as the brush is located at the rear end of the main receptacle 10, the receiving means 43 may be located immediately in front thereof so that the sweepings instead of being thrown forwardly under the bottom, as is often the case when the brush is located forwardly of the receiving receptacle and it is necessary that the brush carry the sweepings over to the rear before depositing them in a receptacle, which is especially undesirable when approaching a walk. Also the location of the brush to the rear of the receptacle allows the operator to approach nearer to bushes and similar obstructions in a lawn as it may be swung in under the branches thereof.

It will be apparent that the device is very simple in construction and will, therefore, be comparatively cheap to manufacture and not likely to get out of order and that the peculiar arrangement of the auxiliary receptacle and the brush with respect to the main receptacle, increases the effectiveness thereof and renders it easier of operation. Furthermore, the hinged bottom for the main receptacle in conjunction with the auxiliary receptacle provides a simple and easily operated means for removing the sweepings.

Having thus set forth the nature of my invention, what I claim is:

1. A lawn sweeper comprising a receptacle for the sweepings, said receptacle being open at its forward end, supporting wheels adjacent the forward end of the receptacle, a rotating brush adjacent the rear end of the receptacle, means for driving the brush in a direction such that the lower side of the brush moves toward the receptacle and in the direction of movement of the sweeper, and a second receptacle removably mounted in front of the open end of the first receptacle and open at its rear end so as to communicate therewith.

2. A lawn sweeper comprising a receptacle for the sweepings open at its forward end, a rotating brush adjacent the other end, means for rotating the brush in a direction such that the lower side of the brush moves toward the receptacle and in the direction of movement of the sweeper, a second receptacle removably mounted forwardly of the open end of the first receptacle and having an open end opposed to that of the first receptacle and communicating therewith, and means for transferring the sweepings from the first to the second receptacle comprising a bottom for the first receptacle hinged adjacent the open end thereof and having at its other end a free edge located closely adjacent the point of contact of the brush and the surface to be swept and adapted to receive the sweepings directly therefrom.

3. A lawn sweeper comprising a receptacle for the sweepings open at its forward end, and having a bottom hinged adjacent said open end, supporting wheels adjacent said forward end, a rotating brush adjacent the rear end, means for rotating the brush in a direction such that the lower side of the brush moves toward the receptacle and in the direction of movement of the sweeper, a second receptacle removably mounted on the first receptacle forwardly of the supporting wheels and having an open end opposed to and in alignment with the open end of the first receptacle, and means for raising the free end of the hinged bottom to transfer sweepings from the first to the second receptacle.

4. A lawn sweeper comprising a receptacle for the sweepings open at its forward end, supporting wheels for the receptacle adjacent said forward end, a second receptacle removably mounted at the forward end of the first receptacle forwardly of the wheels and open at its rear end so as to communicate with the first receptacle, a rotating brush mounted at the rear end of the first receptacle, means for driving the brush in a direction such that the lower side of the brush moves toward the receptacle and in the direction of movement of the sweeper, means for transferring sweepings from the first to the second receptacle, a handle for operating the sweeper, and means adjacent said handle for operating the transfer means.

5. A lawn sweeper comprising a receptacle for the sweepings and open at one end thereof, a rotating brush adjacent said open end, means for rotating the brush in a direction such that the lower side of the brush moves toward the receptacle, a cover for the brush, coacting means carried by the receptacle and cover for removably securing the cover over the brush and in position to close said open end of the receptacle, and means carried by the cover on the opposite side of the brush from the receptacle to receive and hold sweepings carried over by the brush.

In testimony whereof I affix my signature.

JOHN H. BRYANT.